Nov. 10, 1964  R. M. NELDEN  3,156,335
TORQUE LIMITING FLUID DRIVE
Filed Nov. 17, 1958  2 Sheets-Sheet 2

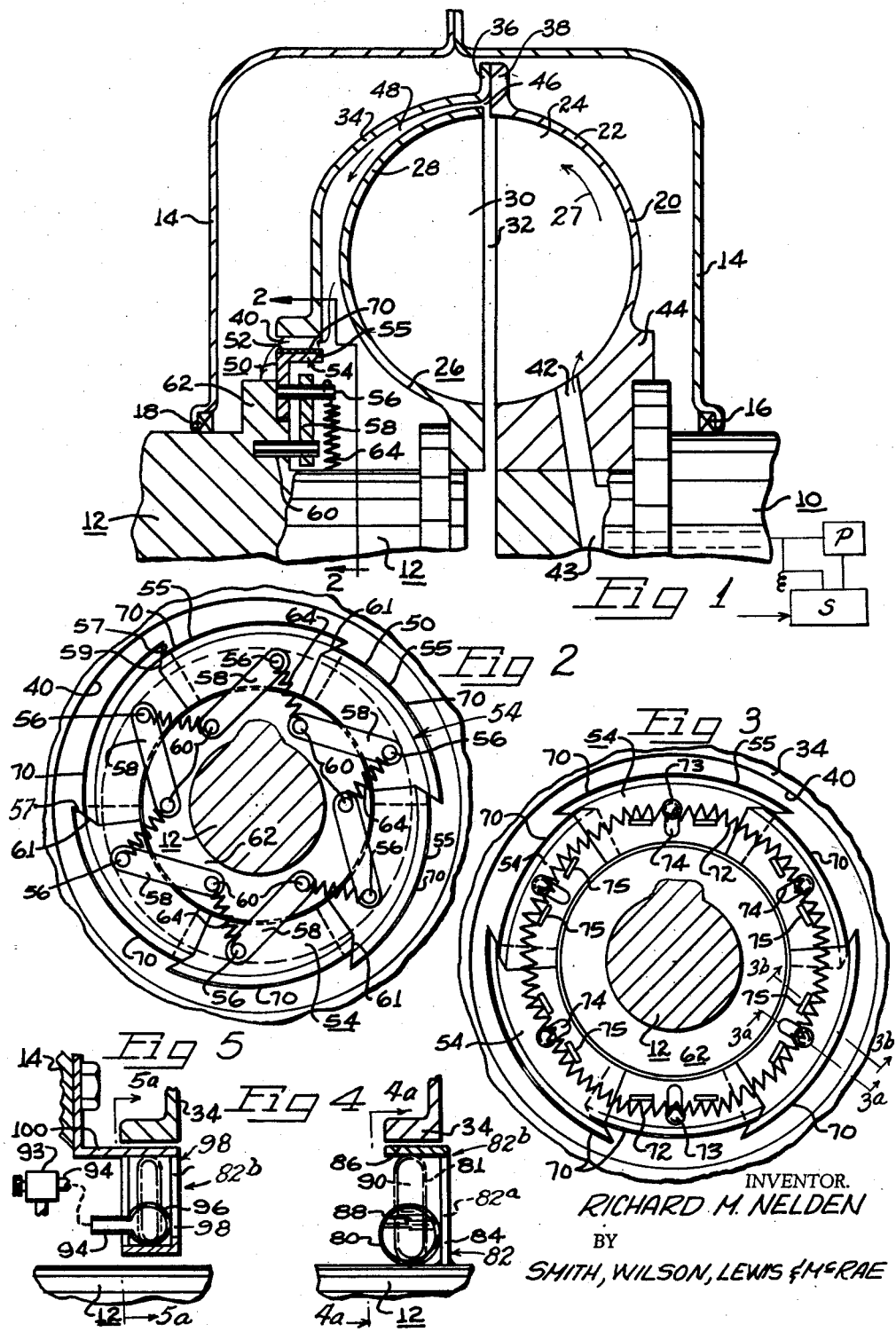

INVENTOR.
RICHARD M. NELDEN
BY
WILSON, SETTLE & CRAIG
ATTORNEYS

United States Patent Office 3,156,335
Patented Nov. 10, 1964

3,156,335
TORQUE LIMITING FLUID DRIVE
Richard Marine Nelden, Birmingham, Mich., assignor to American Radiator & Standard Sanitary Corporation, New York, N.Y., a corporation of Delaware
Filed Nov. 17, 1958, Ser. No. 774,485
7 Claims. (Cl. 192—3.2)

This invention relates to fluid couplings wherein the torque transmitted by the coupling varies in proportion to the quantity of fluid contained in the power transmitting circuit, and more particularly to a centrifugally actuated device for maintaining a quantity of fluid in the circuit responsive to the speed of the driven shaft, which in turn varies proportional to the load exerted on the driven shaft.

In the operation of fluid couplings, particularly of the so-called traction type wherein the speed of the driven shaft and the power transmitted through the coupling remain substantially constant, it is desirable that automatically operable means be provided for limiting the torque transmitting capacity of the fluid coupling.

In the operation of fluid couplings of this type the torque transmitted at a given percent of filling of the unit is a function of the slip between the impeller and turbine members. Fluid couplings are employed to transmit torque from a driving device to a driven device. These fluid couplings function to provide a smooth impulse-free even flow of torque, and it is important that means be provided for protecting the driving and driven members in the event an overload condition is encountered, as for example by the seizing of a bearing which would rupture one of the units if the torque of the driving member were continuously exerted on the driven member. I have found that fluid couplings interposed between driving and driven devices can embody a load limiting characteristic by providing speed responsive valve means for controlling the quantity of fluid in the power transmitting fluid circuit thereby automatically reducing the torque transmitted within a safe operating limit in the event an overload condition is encountered.

An object of my invention is therefore to provide a fluid coupling having a centrifugally operated valve responsive to the speed of the driven shaft for varying the quantity of fluid in the power transmitting fluid circuit.

Another object of my invention resides in the provision of a valve member interposed between driving and driven members and responsive to the speed of the driven member for varying the quantity of fluid in a fluid coupling in response to variations of load to which the driven shaft is subjected.

Another object of my invention is to provide an improved fluid coupling wherein a centrifugally actuated valve responsive to the speed of the driven member is provided to control the quantity of fluid in the fluid circuit to effect a partial emptying of the circuit in the event an overload condition is encountered to limit the torque transmitted by the coupling to safe operating limits.

Still another object of my invention resides in the provision of a fluid coupling wherein a controlled acceleration of the driven shaft is maintained within a safe operating torque range.

Another object is to provide a centrifugally operated iris-type valve member responsive to variations of speed of the driven shaft to engage a portion of the impeller to restrict fluid losses from the circuit proportional to the speed of the driven shaft.

Still a further object of my invention is to provide centrifugally actuated valve means responsive to variations of pressure developed by rotation of the driven shaft controlling the quantity of fluid in a fluid coupling.

Yet a further object of my invention resides in the provision of a centrifugally actuated device responsive to variations of speed of driving and driven members to mechanically clutch the driven member to a driving member when slippage between the rotatable members is at a minimum.

Another object of my invention is to provide a centrifugally actuated valve member responsive to the speed of a driven shaft to reduce fluid losses from a fluid circuit as a driven shaft speeds up to a substantial synchronization to the speed of the driving shaft followed by a frictional engagement of the driving and driven members to provide a one-to-one ratio mechanical drive when the turbine is operating at substantially the same speed as the driving shaft.

Other objects of this invention will appear in the following description and appended claims, reference being had to the accompanying drawings forming a part of this specification wherein like reference characters designate corresponding parts in the several views.

In the drawings:

FIGURE 1 is a longitudinal sectional view of a portion of a fluid coupling embodying my invention;

FIG. 2 is a fragmentary sectional view taken substantially on the line 2—2 of FIG. 1 looking in the direction of the arrows;

FIG. 3 is a fragmentary sectional view in the same direction as FIG. 2 but illustrating a modified form of valve mechanism which may be utilized in the invention;

FIG. 4 is a fragmentary sectional view taken in the same direction as FIG. 1 but illustrating a modified form of valve control mechanism of the invention mounted for rotation with the driven shaft;

FIG. 5 is a view similar to FIG. 4 but illustrating a further modified form of the invention wherein the valve mechanism is mounted on a stationary member, said valve mechanism being operated by a pump driven from the coupling output shaft.

Figure 3A:
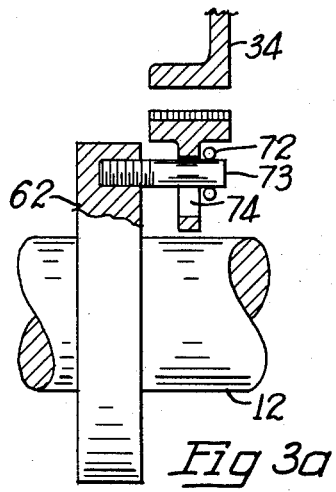
FIGURE 3a is a fragmentary sectional view taken along line 3a—3a of FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIG. 1 it will be noted that aligned driving and driven shafts 10 and 12 are rotatably mounted in suitable bearings (not shown). A stationary housing 14 surrounds the driving and driven shafts, suitable fluid seals 16 and 18 being interposed between the enclosing housing 14 and the driving and driven shafts 10 and 12.

The driving shaft 10 is provided with an impeller 20 having a shell 22 and a plurality of radially extended vanes 24. Positioned in confronting relation to the impeller 20 is a turbine or runner 26 carried by the driven shaft 12 and having a shell 28 provided with a plurality of radially extended vanes 30. The vanes 24 of the impeller 20 and the vanes 30 of the turbine 26 are positioned to move relatively closely to each other, an axially extending space 32 being interposed therebetween for mechanical clearance.

A turbine casing 34 is provided with a radial flange 36 secured in any convenient manner to a circumferential flange 38 carried by the impeller shell 22. The turbine casing 34 encloses the tubine 26 and extends radially inwardly terminating, for example, in a cylindrical drum surface 40 through which fluid may escape from the power transmitting fluid circuit interposed between the impeller and turbine shells 22 and 28.

A pump P, FIGURE 1, is provided for introducing fluid into the power transmitting fluid circuit. This takes fluid from sump S at the bottom of casing 14 and directs it by a passage 43 in shaft 12 to a plurality of radially extended passages 42 through the hub 44 of the impeller communicating with the space within the impeller shell 22 between spaced vanes 24. It will, of course, be apparent that if desired the fluid inlet may be interposed between the impeller and turbine members 20 and 26 communicating with the space 32 between the impeller and turbine vanes 24 and 30.

It will be noted that in the operation of the device fluid introduced into the impeller flows outwardly and impinges on the shell 28 of the turbine 26, along the arrow 27 direction, a portion of the fluid escaping through a space 46 between the outer periphery of the shell 28 and the inner surface of the turbine casing 34. The space 48 between the outer surface of the turbine shell 28 and the inner surface of the turbine casing 34 is thus maintained filled with fluid. The circulation of pump P will discharge through the space defined by the surfaces 40, 70 and drop to the sump S, below. This is indicated by the arrows.

A centrifugally-actuated valve mechanism 50 is driven by the driven shaft 12 and moves radially outwardly in response to increasing speed of the driven shaft to reduce the space between the outer surfaces 52 of the valve mechanism (when in the retracted position) and the drum surface 40, thereby throttling the escape of fluid from the space 48 and increasing the quantity of fluid, or the percent of fill of the power transmitting fluid circuit. A relief valve, not shown, or leakage between the segments of the centrifugal valve assembly will accommodate the circulation of the fill pump P, FIGURE 1.

As shown more clearly in FIG. 2 it will be noted that the centrifugal valve mechanism 50 consists of a plurality of arcuate shaped circumferentially extending radially movable segments 54 of L-shaped cross section. Segments 54 are pivotally connected at 56 to end portions of links 58 which are in turn pivotally mounted on pins 60 carried by a ring 62 integrally formed with or otherwise carried on the driven shaft 12. It will be noted that tension springs 64 are interposed between the segments 54 and the ring 62 to provide a yielding force urging the segments 54 radially inwardly. It will thus be apparent that as the speed of the driven shaft 12 increases, centrifugal force exerted on the segments 54 will move them radially outwardly toward the inner drum surface 40 thereby restricting the quantity of fluid that can escape from the space 48 to increase the quantity of fluid in the circuit, thereby reducing the slippage between the impeller and turbine members and increasing the quantity of torque transmitted by the coupling.

In the operation of my improved fluid coupling it will be noted that substantially constant acceleration is provided. As fluid is introduced into the fluid circuit the fluid escapes from the space 48 beneath the drum surface 40 of the turbine casing, thereby limiting the torque transmitting capacity of the coupling. As the driven shaft 12 speeds up, the centrifugal valve mechanism 50 is actuated, the segments 54 moving out radially together since they are disposed in nested relation relative to each other, the ends of each segment being shifted radially outwardly by the short, axial leg 55 of the next adjacent segment. In connection with nesting of the segments it will be noted that lateral edge portion 57 of each segment is located upstream from portion 59 of the adjacent segment, the arrangement being such that the adjacent lateral edge portions overlap each other even in the expanded high speed position of the valve mechanism. End portions 61 of legs 55 are tapered to prevent the segments from jamming in their opened or closed positions. The links 58 and ring 62 maintain proper straight line movement between the valve segments to reduce the space between the drum surface 40 and the outer surface 52 of the valve mechanism 50. As the coupling continues to accelerate the quantity of fluid in the power transmitting fluid circuit increases and the degree of slippage between the driven shaft and the driving shaft is reduced. When the outer surface 52 of the centrifugal valve 50 approaches the drum surface 40 of the turbine casing 34, slippage between the driving and driven shafts is minimized.

If desired, friction linings 70 are optionally attached to the outer surface 52 of the segments 54 to engage the drum or surface 40 of the turbine casing to frictionally clutch the driven shaft 12 to the turbine casing 34, the impeller 20 and driving shaft 10 thereby mechanically locking up the unit and providing a one-to-one speed ratio or direct drive.

It will be noted that if the turbine 26 and driven shaft 12 are subjected to an overload condition they slow down whereupon the springs 64 retract the segments 54 thereby interrupting the direct drive between the linings 70 and the inner drum surface 40 and opening a gap therebetween to permit the escape of fluid from the power transmitting fluid circuit.

Attention is directed to the fact that the internal diameter of the drum surface 40 can be varied radially to limit the extent of the initial filling to limit initial torque capacity of the coupling during acceleration or under overload conditions. It will be noted further that relocating the drum surface 40 radially outwardly will result in a lowering of the initial torque capacity of the coupling, and conversely a relocation of the drum surface 40 radially inwardly will result in a higher stalled torque capacity. During starting periods the driving motor can accelerate rapidly to substantially its normal driving speed before being subjected to the load of the driven device, time being required to fill the coupling and to permit it to establish its vortex and carry the load. In this manner an easy transition is effected between the torque of the driving member and the load being exerted by the driven device.

Figure 3B:
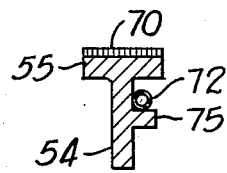
FIGURE 3b is a fragmentary sectional view taken along the line 3b—3b of FIGURE 3.

Referring now more particularly to FIG. 3 it will be noted that a single coil spring or garter spring 72 is supported on spaced clips 75 of the segments 54 to exert substantially equalized force on all of the circumferentially spaced segments 54 urging them radially inwardly in opposition to centrifugal force. Ring 62 carries guide pins 73 which extend through slots 74 in the segments to guide them in their radial movements. It will be noted that the segments have their lateral edge areas overlapped in the same manner as the segments in the FIG. 1 embodiment. However, the FIG. 3 segments are equipped with leg portions 55 which have their end portions tapered in opposite directions to effect the desired cam actions for preventing the segments from jamming. In the fully expanded positions the linings 70 are engaged with surface 40 so as to provide a mechanical drive between the casing 34 and shaft 12 in the same manner as with the FIG. 1 embodiment; also, theh segments maintain overlapment with one another so as to seal against escape of fluid from the working circuit.

Figure 4A:
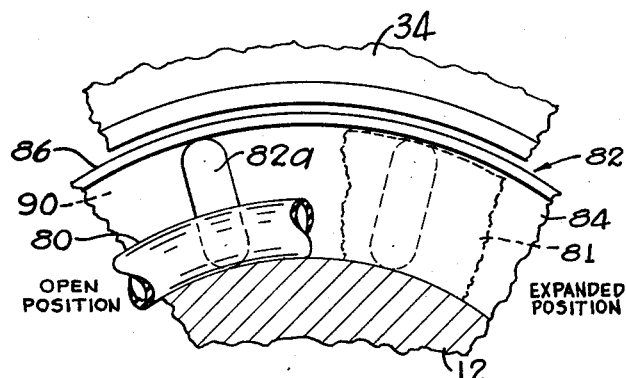
FIGURE 4a is a fragmentary elevational view taken along 4a—4a of FIGURE 4.

Referring to FIG. 4, which shows another embodiment of the invention, a flexible tube or envelope 80 of rubber or other material is mounted around shaft 12, being attached at its inner periphery to the shaft, in an enclosing spider 82 connected as by welding to shaft 12, said spider having radially and axially extended portions 84 and 86 providing a retaining cage for the tube 80. The spider 82 includes ports 82a for passage of fluid in the arrow 82b direction. The tube 80 is preferably filled with a relatively heavy substance 88, such as mercury or shot on which centrifugal force may be exerted to move the tube radially outward toward its dotted line position 81. Outward movement of the tube reduces the radial dimension of the gap 90 between the inner surface of wall portion 86 and the adjacent surface of tube 80, thereby progressively restricting the escape of fluid through ports 82a to increase the torque transmitted and reduce the slippage between the turbine and impeller members. The space between surfaces 34 and 86 is shown exaggerated. In actuality this is a close running fit so that fluid losses at this point are negligible. FIGURE 4a illustrates the structure of FIGURE 4 in elevation for greater clarity.

Figure 5A:
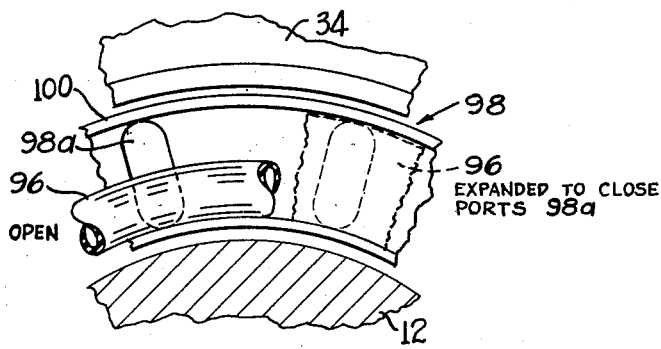
FIGURE 5a is a fragmentary elevational view taken along line 5a—5a of FIGURE 5.

The embodiment illustrated in FIG. 5 is similar in many respects as regards function to that illustrated in FIG. 4. In this embodiment of my invention, however, a fluid pump 93 is driven by the driven shaft 12 through suitable gearing (not shown) to exert in a conduit 94 fluid pressure proportional to the speed of the driven shaft 12 to inflate a flexible tube 96, fastened at its inner periphery to enclosing cage 89 thereby inducing it to move radially outwardly in a fixed cage 98 carried by the bracket 100 secured to housing 14. The tube 96 is fixed relative to rotational movement within cage 98 and thus moves only in a radial manner for blocking flow through the cage. To provide through flow in the arrow 82b direction, as in FIGURE 4, the sides of the cage 98 are ported as at 98a. The indicated inflation of element 96 blocks the ports 98a to stop flow therethrough. FIGURE 5a illustrates the structure of FIGURE 5 in elevation for greater clarity. Again, it is to be pointed out that the annular gap between elements 34 and 100 is exaggerated. This is actually a close running fit to prevent oil losses.

As regards the space between shaft 12 and cage 98, this is of no consequence because it is at the full circuit level. When the coupling is filled to this level, it is operating at full capacity and the space accommodates the circulation provided by the supply pump.

It will be noted that each of the illustrated embodiments is characterized by an automatic fluid reduction in the fluid circuit at low runner speeds so as to limit the torque transmitted to the runner in the event of an overload condition or during starting periods. This is effective because the coupling has a much greater pump capacity than the supply pump. This safety feature is attained in a low-cost, self-contained unit requiring minimum maintenance and long service life.

I claim:

1. In an overload protected fluid coupling, vaned impeller and runner shells mounted in opposed rotatable relation, said impeller and runner shells being respectively mounted on aligned input and output shafts and being axially spaced to define a radially extending first space therebetween for exhausting fluid from said coupling, means for supplying hydraulic fluid to said coupling, a casing connected to said impeller shell and extending in surrounding relation to said runner shell to define an annular space around said output shaft in fluid flow communication with said first space for exhausting fluid from said coupling and a valve on said fluid coupling and positioned in said annular space to control fluid flow therethrough, said valve including means operatively connected to one of the runner shell and output shaft actuating the valve toward a closed position upon an increase in output speed and actuating the valve toward an open position upon a decrease in output speed.

2. In a fluid coupling having vaned impeller and runner shells positioned in opposed rotatable relation and respectively mounted on aligned input and output shafts, with the impeller and runner shells being axially spaced to define a radially extending space therebetween for exhaust of fluid from the coupling and means for supplying hydraulic fluid to the coupling, the coupling being characterized by a pumping action of hydraulic fluid through the radial exhaust space upon overspeed of the impeller shell with respect to the runner shell, the improvement of a casing connected to the impeller shell adjacent the radially extending exhaust space and extending in enclosing relation around the runner shell to define an annular space around the output shaft in fluid flow connection with the impeller-runner space, and a valve positioned in said annular space and connected to the output shaft, said valve including means responsive to the speed of the output shaft actuating the valve toward a closed position upon an increase in output speed and actuating the valve toward an open position upon a decrease in output speed.

3. In a fluid coupling, vaned impeller and runner shells mounted in opposed rotatable relation, said impeller and runner shells being respectively fixedly mounted on aligned and rotatable input and output shafts and being spaced to define a radially extending space therebetween for exahust of fluid from said coupling, means for introducing fluid into said coupling from an external source, a casing connected to said impeller shell adjacent said radial space and extending in surrounding relation to said runner shell to define an annular space around said output shaft and in fluid flow connection with said radial space, a plurality of valve segments mounted around said shaft within said annular space and interfitting to form a fluid barrier, said segments being carried for radial movement by said output shaft, and spring means normally biasing said segments toward said shaft, whereby said segments are moved radially outwardly by centrifugal force upon rotation of said shaft to restrict the flow capacity of said annular space in response to an increase in speed of said output shaft and moved radially inwardly by said spring means to increase the flow capacity of said annular space in response to a decrease in speed of said output shaft.

4. In a fluid coupling, vaned impeller and runner shells mounted in opposed relation, said impeller and runner shells being respectively fixedly mounted on aligned and rotatable input and output shafts, said shells being spaced to define a radially extending space therebetween for exahusting fluid from said coupling, means for introducing fluid to said coupling from an external source, a casing connected to said impeller shell adjacent said exhaust space and extending in surrounding relation to said runner shell to define an annular space around said output shaft and in fluid flow connection with said exhaust space, said casing defining a circular drum surface as the outer periphery of said annular space, a plurality of radially movable valve segments positioned around said output shaft within said annular space and slidably interfitting to form a radially extensible annular fluid barrier, means supporting said segments for radial movement on said output shaft, said segments having arcuate outer peripheral contour of friction material adapted to engage said drum surface and means normally biasing said segments toward said shaft, whereby said segments are moved radially by centrifugal force to alter the flow capacity of said annular space in response to variations in speed of said output shaft and said friction material is adapted to frictionally clutch said output shaft with said drum surface as said output shaft approaches the operating speed of said input shaft.

5. In an overload protected fluid coupling, vaned impeller and runner shells mounted in opposed rotatable relation, said impeller and runner shells being respectively mounted on aligned input and output shafts and being axially spaced to define a radially extending first space therebetween for exhausting fluid from said coupling, means for supplying hydraulic fluid to said coupling, a casing connected to said impeller shell and extending in surrounding relation to said runner shell to define an annular space around said output shaft in fluid flow communication with said first space for exhausting fluid from said coupling, and a valve on said fluid coupling and positioned in said annular space to control fluid flow therethrough, said valve comprising an annular spider in said annular space and connected to said output shaft, an endless flexible tube carried by said output shaft and partially filling said annular spider, and said tube being filled with heavy material, whereby centrifugal force throws said heavy material radially outwardly and carries said tube to annular disc-like form to restrict flow through said spider as said output shaft speed increases, said heavy material moving radially inwardly upon a decrease in output shaft speed to increase fluid flow through said spider.

6. In an overload protected fluid coupling, vaned impeller and runner shells mounted in opposed rotatable relation, said impeller and runner shells being respectively mounted on aligned input and output shafts and being axially spaced to define a radially extending first space therebetween for exhausting fluid from said coupling, means for supplying hydraulic fluid to said coupling, a casing connected to said impeller shell and extending in surrounding relation to said runner shell to define an annular space around said output shaft in fluid flow communication with said first space for exhausting fluid from said coupling, and a valve on said fluid coupling and positioned in said annular space to control fluid flow therethrough, said valve comprising an endless flexible tube fixedly supported in said annular space, and means for inflating and deflating said tube to annular disc-like form in proportion to increases and decreases in speed, respectively, of said output shaft, whereby fluid flow through said annular space is increased in response to decreases in speed of said output shaft and is restricted in response to increases in speed of the output shaft.

7. A fluid coupling as defined in claim 6 wherein the means for inflating and deflating said flexible tube comprises a pump connected in operable relation to said flexible tube, and means for driving said pump in synchronized relation to said output shaft.

References Cited in the file of this patent

UNITED STATES PATENTS

| | | |
|---|---|---|
| 1,873,688 | Walker | Aug. 23, 1932 |
| 2,281,077 | Pollard | Apr. 28, 1942 |
| 2,354,174 | Schmitter | July 18, 1944 |
| 2,360,710 | Nutt et al. | Oct. 17, 1944 |
| 2,397,862 | Jencick | Apr. 2, 1946 |
| 2,655,054 | Kelley | Oct. 13, 1953 |
| 2,689,458 | Weymann | Sept. 21, 1954 |
| 2,894,609 | Tattersall | July 14, 1959 |

FOREIGN PATENTS

| | | |
|---|---|---|
| 444,171 | Great Britain | Mar. 16, 1936 |
| 602,020 | Great Britain | May 18, 1948 |